United States Patent [19]

Ohkuni et al.

[11] Patent Number: 4,510,983
[45] Date of Patent: Apr. 16, 1985

[54] PAIR OF PNEUMATIC BELTED TIRES FOR MOTORCYCLE

[75] Inventors: Shinichiro Ohkuni, Akishima; Yoichi Kitazawa, Higashiyamato, both of Japan

[73] Assignee: Bridgestone Tire Company Limited, Tokyo, Japan

[21] Appl. No.: 537,608

[22] Filed: Sep. 30, 1983

[30] Foreign Application Priority Data

Oct. 18, 1982 [JP] Japan ................... 57/182623

[51] Int. Cl.³ .................. B60C 9/20; B60C 15/04; B60C 9/08
[52] U.S. Cl. .................. 152/361 R; 152/352 R; 152/354 R; 152/362 R; 152/362 CS; 152/209 R; 180/223
[58] Field of Search ........... 152/352 R, 353 R, 354 R, 152/354 RB, 355, 356 R, 361 R, 361 DM, 361 FP, 362 R, 362 CS; 180/223

[56] References Cited

U.S. PATENT DOCUMENTS

| | | | |
|---|---|---|---|
| 3,881,538 | 5/1975 | Mirtain | 152/361 FP |
| 3,896,869 | 7/1975 | Fujishima et al. | 152/361 R |
| 3,982,580 | 9/1976 | Inoue et al. | 152/361 R |
| 4,096,899 | 6/1978 | Kitazawa et al. | 152/362 R |
| 4,258,775 | 3/1981 | Samoto et al. | 152/362 R |
| 4,263,955 | 4/1981 | Ikeda | 152/362 R |

FOREIGN PATENT DOCUMENTS

| | | | |
|---|---|---|---|
| 1191575 | 5/1970 | United Kingdom | 152/356 R |
| 1222759 | 2/1971 | United Kingdom | 152/356 |
| 2102354A | 2/1983 | United Kingdom | 152/356 R |

OTHER PUBLICATIONS

"New M/C Tyres", *European Rubber Journal*, 6-1983, at p. 15.

Primary Examiner—Lois E. Boland
Attorney, Agent, or Firm—Sughrue, Mion, Zinn, Macpeak and Seas

[57] ABSTRACT

A pair of pneumatic belted tires for use in motorcycle are disclosed, each of which comprises a tread extending over a width corresponding to the maximum width of the tire, a pair of sidewalls, a pair of bead portions each containing a bead core therein, a carcass composed of at least one rubberized ply containing organic fiber cords inclined at an angle of 50°–90° with respect to the equatorial plane of the tire, and a belt composed of at least two rubberized plies each containing cords arranged at a certain inclination angle with respect to the equatorial plane. In such a tire pair, an inclination angle $\alpha$ of cord in the belt for rear wheel tire and an inclination angle $\beta$ of cord in the belt for front wheel tire satisfy the following relationship:

$$(\alpha - \beta) \geq 4°$$

when $$15° \leq \alpha \leq 26°,$$

or $$(\alpha - \beta) \geq -0.3\alpha + 11.8°$$

when $$26° \leq \alpha \leq 36°.$$

13 Claims, 4 Drawing Figures

PAIR OF PNEUMATIC BELTED TIRES FOR MOTORCYCLE

This invention relates to pneumatic belted tires for motorcycles, and more particularly to a pair of pneumatic belted tires for a motorcycle which provide a good balance as an assembly with a motorcycle body.

In this type of the tire, it is known that rigidity reinforcement is achieved by a carcass composed of one or few rubberized plies each containing fiber or metal cords arranged in a direction of 50°–90° with respect to the equatorial plane of the tire and a substantially inextensible belt disposed between the carcass and tread and composed of plural rubberized plies each containing metal or fiber cords inclined at an angle of about 15° with respect to the equatorial plane of the tire, the cords of which being crossed with each other.

Such tires exhibit excellent performance as compared with usually used bias tires (i.e. the tire comprises a carcass composed of plural rubberized plies each containing fiber cords inclined at an angle of about 35° with respect to the equatorial plane of the tire, the cords of which being crossed with each other). That is, they are good in the ride feeling because of the considerable flexibility of the sidewall portion, while high cornering performance or good steering stability is obtained because the rigidity is given by the belt provided on the crown portion of the tire. Also the wear resistance is good.

If it is intended to use the radial tire of the above mentioned type in motorcycles as a two-wheeled vehicle, there is however caused a problem relating to the steering stability. Motorcycles are susceptible to an insufficient camber thrust acting on the tire in the cornering or turning and an external disturbance mainly acting on the tire in the straight running.

In general, when the body of the motorcycle is inclined toward the cornering side during the cornering or turning, a camber angle (i.e. an inclination angle of the equatorial plane of the tire with respect to a plane perpendicular to horizontal plane) is given to the tire, whereby a camber thrust is produced between the tire and the road surface in opposition to a centrifugal force acting to the horizontal plane. The cornering performance of the tire for motorcycle is largely dependent upon the magnitude of camber thrust. Now, the camber thrust of the radial tire, which is insignificant in the four-wheeled vehicles, is about ½ to ⅔ of that of the bias tire. This is due to the fact that the sidewall of the radial tire is considerably flexible as a whole as compared with that of the bias tire. Such flexible sidewall susceptibly responds to the external disturbance in the straight running, which causes the deterioration of the steering stability in the motorcycles frequently running at high speed. This deterioration of the steering stability is accompanied with a fatal consequence such as a rider being dismounted which is entirely different from the case of applying the radial tire to the four-wheeled vehicle.

The inventors have made various studies with respect to radial tires for motorcycles and proposed in Japanese Patent laid open No. 58-22,704 that the aforementioned drawbacks can be solved by providing a peculiar reinforcing structure around the sidewall portion of the tire and also the effect of improving wet skid resistance is obtained to such an extent that it has never been attained in the bias tire.

Particularly, when the tires inclusive of the above radial tire in which a carcass is composed of rubberized plies containing organic fiber cords arranged at an angle of 50°–90° with respect to the equatorial plane of the tire as a body reinforcement are applied to two-wheeled vehicles, there is still a subject matter inherent to the pneumatic tire for motorcycle and further it is required to improve high straight-running stability and cornering performance during high-speed running.

The subject matter inherent to the pneumatic tire for a motorcycle is such a phenomenon that when a pair of tires having the same internal reinforcing structure are applied to front and rear wheels of the motorcycle, low-frequency vibration of about 1–3 Hz frequently called as wobble exclusively gives rise to the rear wheel side during the running, which brings uneasy feeling on a rider.

It is, therefore, an object of the invention to effectively eliminate the above mentioned peculiar vibration phenomenon and to considerably improve the high straight-running stability and cornering performance in high-speed running.

According to the invention, there is provided a pair of pneumatic belted tires for use in a motorcycle, each comprising a tread, a pair of sidewalls toroidally extending from said tread, a pair of bead portions each located at each radially inward edge of said sidewalls and containing a bead core therein, a carcass wrapped around said bead core from inside toward outside to reinforce these tread and sidewalls and composed of at least one rubberized ply containing organic fiber cords inclined at an angle of 50°–90° with respect to the equatorial plane of the tire, said tread being extended between said sidewalls up to both positions corresponding to the maximum width of the tire at substantially an equal thickness or that thickness which slightly reduces from the tread center toward both sidewalls, and a belt disposed between said tread and said carcass at a width substantially corresponding to a tread width and composed of at least two rubberized plies each containing cords with a modulus of elasticity of at least 600 kg/mm² arranged at a certain inclination angle with respect to the equatorial plane of the tire, said cords of which being crossed with each other, characterized in that an inclination angle $\alpha$ of cord in said belt of the tire for rear wheel of the motorcycle and an inclination angle $\beta$ of cord in said belt of the tire for front wheel of the motorcycle satisfy the following relationship:

$$(\alpha - \beta) \geq 4°$$

when $$15° \leq \alpha \leq 26°,$$

or $$(\alpha - \beta) \geq -0.3\alpha + 11.8°$$

when $$26° \leq \alpha \leq 36°.$$

In the preferred embodiment of the invention, the tire has the following structural features:

A turnup end of the carcass is overlapped with a side edge of the belt;

A stiffener inclusive of a tapered rubber filler extending above the bead core toward the tread and having a Shore A hardness of at least 60° is disposed between the carcass and the turnup thereof and a top end of the stiffener locates at at least 40% of a radial height H of the sidewall;

The stiffener is a composite structure of the rubber filler with at least one reinforcing layer located between the turnup of the carcass and the rubber filler and containing cords inclined at an angle of 15°–30° with respect to the circumferential direction of the tire;

At least one of top ends of the rubber filler and the reinforcing layer locates within a range of 50%–75% of the radial height of the sidewall;

The belt is composed of two rubberized plies each containing metal cords therein;

The belt is composed of two rubberized plies each containing fiber cords therein;

The belt is composed of one rubberized metal cord ply and one rubberized fiber cord ply, and the fiber cord ply is arranged on the side of the carcass;

The belt is composed of two rubberized plies formed by folding both end parts of a single rubberized fiber cord layer toward a direction of the equatorial plane of the tire;

The metal cord in the belt is formed by twisting 6 to 25 steel filaments with a diameter of not more than 0.15 mm;

The metal cord ply used in the belt has a spacing ratio between cords of 35%–65%; and The inclination angle α of the cord in the belt of the tire for rear wheel is within a range of 20°–34°.

Although the reason why the balance between the front and rear wheels is advantageously improved and the wobble phenomenon is cancelled by controlling the cord angle of the belt in the tire pair for the front and rear wheels as mentioned above is not clearly understood, it is approximately elucidated as follows.

That is, the tire for rear wheel has section height and section width larger than those of the tire for front wheel and particularly a flexible portion in the sidewall is wide as compared with that of the front wheel tire, so that when the cord angles in the belts of the front and rear wheel tires are the same, there is a tendency as a balance for the whole of the tire pair that the rigidity of tread portion is deficient in the front wheel tire and excess in the rear wheel tire as compared with the rigidity of the sidewall. As a result, the balance inside the tire becomes non-uniform and further such a balance is lost due to the cause inherent to the motorcycle body and consequently the wobble phenomenon is produced at a lower running speed.

Therefore, the balance in rigidity between the sidewall and the tread crown is significant in addition to the straight running stability in case of the motorcycle capable of cornering in accordance with camber thrust. In this connection, it is useful to improve the balance between the pair of tires for front and rear wheels by changing the degree of reinforcing effect between the belts of the tire pair.

The invention will now be described in detail with reference to the accompanying drawings, wherein.

Figure 1:
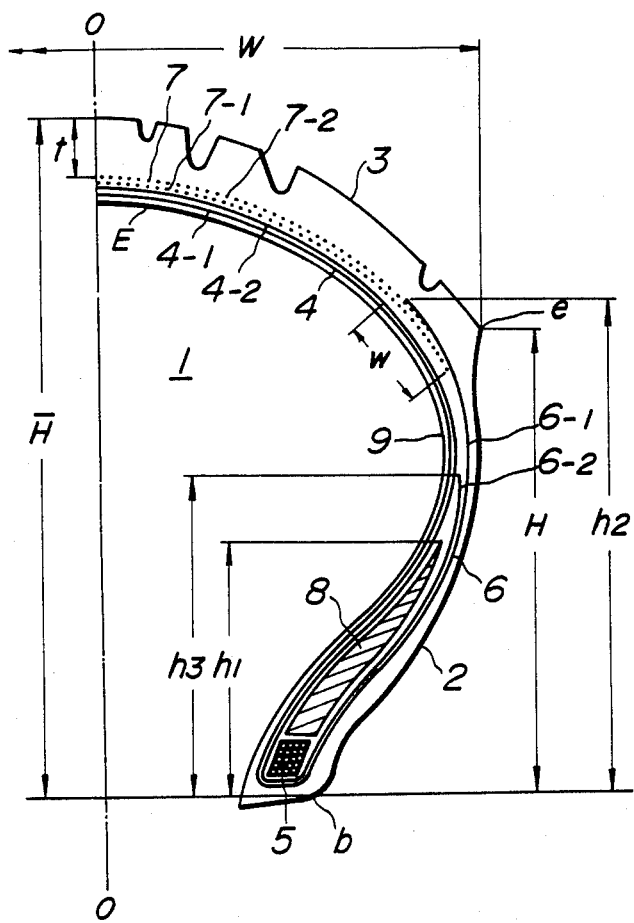
FIG. 1 is a schematic radial half section of an embodiment of the pneumatic belted tire according to the invention.

In FIG. 1 is schematically shown a radial half section of an embodiment of the pneumatic belted tire according to the invention, wherein a tire 1 is formed by toroidally connecting a sidewall 2 to a tread 3. While the left half section of the tire is omitted with respect to an equatorial plane O-O of the tire, it is a matter of course that the tire is symmetrical with respect to the equatorial plane. The sidewall 2 and tread 3 as a whole are reinforced with a carcass 4. In this embodiment, the carcass 4 is composed of two plies $4_{-1}$ and $4_{-2}$, each end of which is wrapped around a bead core 5 embedded in each radially inner end portion of the sidewall 2 from inside toward outside in the axial direction of the tire to form a turnup portion 6.

The carcass 4 is composed of at least one rubberized ply containing cords of an organic fiber such as nylon, rayon, polyester or the like inclined at an angle of 50°–90°, preferably 60°–82° with respect to the equatorial line O-O. When the carcass is composed of two or three or possibly four rubberized plies as shown in FIG. 1, the cords of these plies are crossed with each other. Among these carcass plies, both ends of at least one ply are wrapped around the bead cores 5 toward outside in the axial direction of the tire to form turnup portions 6. In the illustrated embodiment, two carcass plies $4_{-1}$ and $4_{-2}$ are wrapped around the bead core 5 to form a higher turnup portion $6_{-1}$ and a lower turnup portion $6_{-2}$, respectively.

The tread 3 extends from the position of the equatorial plane O-O toward both sides thereof at substantially and equal thickness or at that thickness which slightly reduces from the center of the tread 3 toward the sidewall 2 at a thickness ratio of 1:about 0.8. In this case, a tread width W starting from a tread end e corresponds to a maximum width of the tire.

A belt 7 is disposed on a crown portion E of the carcass 4 beneath the tread 3 so as to reinforce the whole region of the tread 3. In this case, the belt 7 may somewhat extend over the tread end e toward the sidewall 2. The belt 7 is composed of plural rubberized plies each containing cords with a modulus of elasticity of at least 600 kg/mm² arranged at an inclination cord angle of 15°–30° with respect to the equatorial plane O-O, the cords of which being crossed with each other.

The term "modulus of elasticity of cord" used herein means to be calculated by the following equation when a relation between load and elongation is measured by applying a tensile force to the cord and a rising slope of the measured load-elongation curve is extended from this curve to determine a load at 10% elongation:

$$\text{Modulus of elasticity of cord} = \frac{F \times 10}{S}$$

wherein F is a load at 10% elongation and S is a sectional area of cord. In this connection, the modulus of elasticity of each of conventionally known cords is exemplified as follows:

| | |
|---|---|
| Nylon-6 | 285 kg/mm² |
| Nylon-66 | 345 kg/mm² |
| Polyester | 456 kg/mm² |
| High-modulus polyester*[1] | 600 kg/mm² |
| Rayon | 650 kg/mm² |

| -continued | |
|---|---|
| Kevlar*2 | 3,700 kg/mm² |
| Steel | 16,000 kg/mm² |

*¹cord of low polymerization degree polyethylene terephthalate having an intrinsic viscosity of 0.3–0.8 as measured in a solvent of o-chlorophenol at a temperature of 25° C.;
cord of aromatic polyamide fiber, made by Du Pont Nemours, E. I.

In the illustrated embodiment, the belt 7 is composed of two plies $7_{-1}$ and $7_{-2}$. As the reinforcing member for the belt, there are considered the case of using metal cords or fiber cords alone in both the plies $7_{-1}$ and $7_{-2}$, the case of using fiber cords in the ply $7_{-1}$ and using metal cords in the ply $7_{-2}$, and the like.

Figure 4:
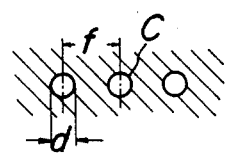
FIG. 4 is a partial enlarged view of the metal cord ply for the belt used in the invention.

As the metal cord, it is desirable to use steel cord obtained by twisting 6 to 25 steel filaments, each having a diameter of not more than 0.15 mm, with each other. Concretely, the diameter of the steel filament is 0.15 mm, 0.12 mm or 0.10 mm. Furthermore, when the metal cord is used in the plies for the belt, it is preferable to arrange the metal cords at a spacing ratio of 35%–65%, and in this case the flexural rigidity of the cord is not increased excessively in the thickness direction of the belt. The spacing ratio of metal cords is defined by the following equation as shown in FIG. 4:

$$\text{Spacing ratio} = \frac{f - d}{f} \times 100(\%)$$

wherein f is a center distance between cords C and d is a diameter of cord C.

According to the invention, a tapered rubber filler 8 extending from the upper part of the bead core 5 toward a direction of the tread 3 is disposed between the carcass 4 and the turnup portion 6 thereof. The rubber filler 8 has a Shore A hardness of at least 60°, preferably not less than 65°. The upper limit of the hardness is not critical in view of tire performance, but when the hardness is higher than about 98°, the working efficiency becomes undesirably poor in view of tire production.

When radial heights extending from a bead base b to ends in tread direction of the rubber filler 8 and turnup portions $6_{-1}$ and $6_{-2}$ are $h_1$, $h_2$ and $h_3$, respectively and a height of the sidewall expressed by a radial distance from the bead base b to the tread end e is H, at least one of heights $h_1$, $h_2$ and $h_3$ according to the invention corresponds to at least 60% of the height H of the sidewall. In FIG. 1, the heights $h_1$, $h_2$ and $h_3$ are 55%, 107% and 70% of the height H of the sidewall, respectively. In this embodiment, the heights $h_2$ and $h_3$ exceeds the standard value 60% and also the height $h_1$ of the rubber filler 8 is a higher level, so that a flex zone 9 of the sidewall 2 is forced toward the direction of the tread 3 and at the same time the deformation of the flex zone 9 itself is restrained by overlapping the end part of the turnup portion $6_{-1}$ with the belt 7. In this case, it is more desirable that an overlap width w of the end part of the turnup portion 6 to the belt 7 is at least 10 mm and the height $h_1$ of the rubber filler is within a range of 50–75% of the height H of the sidewall.

Although not shown in FIG. 1, a cord reinforcing layer may be disposed adjacent to the rubber filler 8 from a position near the bear core 5 toward the tread direction. As the cord reinforcing layer, the fiber or metal cords are arranged at an inclination angle of 15°–30° with respect to the circumferential direction of the tire. In this case, the value of the inclination angle is measured in the vicinity of the bead core. The cord reinforcing layer may be arranged outside the turnup portion 6 of the carcass. However, it is desirable to arrange the cord reinforcing layer adjacent to the turnup portion 6 between the carcass 4 and the turnup portion thereof as a stiffener consisting of a composite structure with the rubber filler.

As a belt 7, a single rubberized fiber cord layer may be used in which both side end portions of the layer are turned around the tread ends e in a direction of the tread and folded in a direction of the equatorial plane O–O to form a fold part. In this case, both free ends of the belt may be opposite to each other in the vicinity of the equatorial plane O–O or may be overlapped with each other. As regards the folding of the ply for the belt, there may be used various means without departing the spirit of the invention. For instance, when using two plies as shown in FIG. 1, one of these plies is made wider than the other ply and both free ends thereof are folded in a direction of the tread or carcass by the conventionally well-known method for the formation of belt structure in pneumatic radial tires for four-wheeled vehicles. Furthermore, each free end of the ply is enveloped with the folded part of the other ply.

In the tire 1 of the illustrated embodiment, the first ply $4_{-1}$ and second ply $4_{-2}$ constituting the carcass 4 have an inclination angle of 75% with respect to the equatorial line O–O, in which the cords of these plies are crossed with each other, and are wrapped around the bead core 5 from inside toward outside to form turnup portions $6_{-1}$ and $6_{-2}$. Furthermore, the hard rubber filler 8 is interposed between the carcass and its turnup portion, and the turnup portion $6_{-1}$ among the turnup portions $6_{-1}$ and $6_{-2}$ is overlapped with each side edge of the belt from the outside. In this case, the overlap width w of the turnup portion $6_{-1}$ is preferable to be at least 10 mm. As the belt 7, the first and second plies $7_{-1}$ and $7_{-2}$ are arranged at a certain step difference over substantially the tread width W, each cord of which is a cord with a twisting construction of 3×4 using steel filament of 0.12 mm diameter. The cord for use in the belt is favorable to be a cord obtained by twisting plural filaments each having a diameter of not more than 0.15 mm, preferably about 0.12 mm in view of the rigidity in tread, durability and other properties. Moreover, it is preferable that the thickness t of the tread 3 is thickest in the equatorial plane O–O of the tire and slightly reduces from the equatorial plane toward the vicinity of the tread end e, which is considered that the thickness of the tread 3 is substantially the same over the tread width as compared with the tire for four-wheeled vehicle.

The effect of the invention will be described with reference to the following examples.

In these examples, there were used various pairs of tires to be mounted on front and rear wheels of a motorcycle each having a fundamental structure as shown in FIG. 1 and the following Table 1, in which the cord angle in the belt 7 for the front and rear wheel tires was changed as shown in the following Table 2.

TABLE 1

| Tire size | Front wheel tire 90/80–19 | Rear wheel tire 120/80–18 |
|---|---|---|
| Tread width W | 93 mm | 116 mm |

TABLE 1-continued

| Tire size | | Front wheel tire 90/80-19 | Rear wheel tire 120/80-18 |
|---|---|---|---|
| | Tire height $\overline{H}$ | 72 mm | 97 mm |
| Carcass 4 | Kind of cord | nylon cord of 840 d/2 | nylon cord of 840 d/2 |
| | Ply number | 2 | 2 |
| | Cord angle | 75° | 75° |
| Belt 7 | Kind of cord | steel filament of 0.12 mm diameter, twisting 3 × 4 | steel filament of 0.12 mm diameter, twisting 3 × 4 |
| | Ply number | 2 | 2 |
| | Cord angle (first and second) plies are the same) | (see table 2) | (see table 2) |
| | Width of first ply ($7_{-1}$) | 90 mm | 120 mm |
| | Width of second ply ($7_{-2}$) | 75 mm | 105 mm |
| Rubber filler 8 | Shore A hardness | 70° | 70° |
| | ($h_1/H$) × 100 | 55% | 55% |
| Turnup portion 6 | ($h_2/H$) × 100 | 107% | 107% |
| | ($h_3/H$) × 100 | 70% | 70% |
| | Overlap width | 15 mm | 15 mm |

TABLE 2a

| Tire No. | Cord angle in belt for front wheel tire ($\beta$) | Cord angle in belt for rear wheel tire ($\alpha$) | Evaluation of effect | Difference of cord angle between front wheel tire and rear wheel tire | Minimum difference of cord angle defined in the invention |
|---|---|---|---|---|---|
| 1 | 12° | 18° | ⊚ | 6° | 4° |
| 2 | 14° | 18° | ⊚ | 4° | 4° |
| 3 | 16° | 18° | x | 2° | 4° |
| 4 | 18° | 18° | x | 0° | 4° |
| 5 | 13° | 22° | ⊚ | 9° | 4° |
| 6 | 17° | 22° | ⊚ | 5° | 4° |
| 7 | 20° | 22° | x | 2° | 4° |
| 8 | 22° | 22° | x | 0° | 4° |
| 9 | 17° | 25° | ⊚ | 8° | 4° |
| 10 | 22° | 25° | x | 3° | 4° |
| 11 | 25° | 25° | x | 0° | 4° |

TABLE 2b

| Tire No. | Cord angle in belt for front wheel tire ($\beta$) | Cord angle in belt for rear wheel tire ($\alpha$) | Evaluation of effect | Difference of cord angle between front wheel tire and rear wheel tire | Minimum difference of cord angle defined in the invention |
|---|---|---|---|---|---|
| 12 | 20° | 30° | | 10° | 2.8° |
| 13 | 22° | 30° | | 8° | 2.8° |
| 14 | 25° | 30° | | 5° | 2.8° |
| 15 | 27° | 30° | | 3° | 2.8° |
| 16 | 30° | 30° | x | 0° | 2.8° |
| 17 | 30° | 36° | | 6° | 1.0° |
| 18 | 32° | 36° | | 4° | 1.0° |
| 19 | 33° | 36° | | 3° | 1.0° |
| 20 | 36° | 36° | x | 0° | 1.0° |
| 21 | 12° | 16° | x | 4° | 4.0° |
| 22 | 15° | 16° | x | 1° | 4.0° |

In Table 2, the tires according to the invention correspond to Tire Nos. 1, 2, 5, 6, 9, 12, 13, 14, 15, 17, 18 and 19, while the remaining Tire Nos. 3, 4, 7, 8, 10, 11, 16, 20, 21 and 22 are control tires.

Since it was difficult to quantitatively evaluate the effect of the tire, the evaluation of effect was confirmed in the following manner.

That is, a motorcycle having a displacement of 650 cc was practically run on a circuit course (4.3 km), during which there was evaluated whether or not the wobble phenomenon occurred until full-opening of throttle valve. In Table 2, symbol ⊚ is the case that there is no wobble phenomenon and the ride feeling is good until the full-opening, symbol o is the case that the wobble phenomenon does not occur or the ride feeling is somewhat poor until the full-opening, and symbol x is the case that the wobble phenomenon occurs and the ride feeling is uncomfortable before the full-opening.

Figure 2:
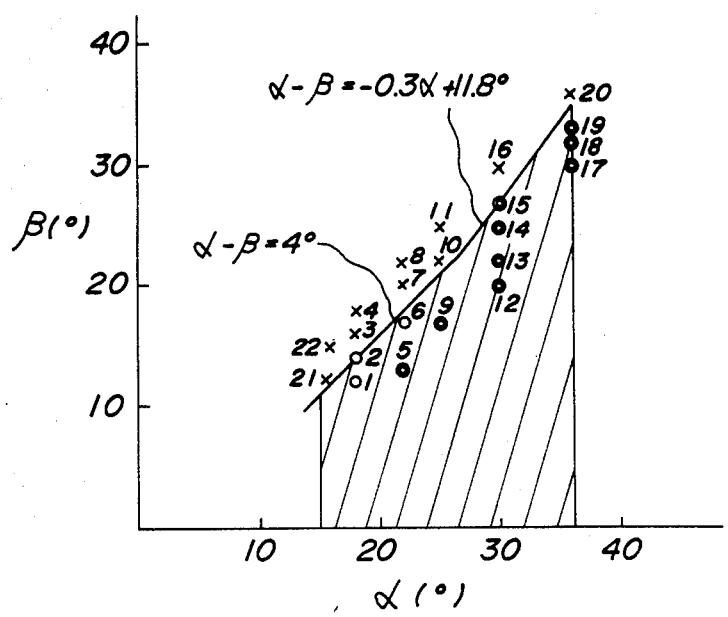
FIG. 2 is a graph showing a relation of cord angle in belt between tires for front and rear wheels.

The evaluation results of Table 2 are represented as a graph in FIG. 2. It is obvious from this graph that the conventional tire combination, i.e. a combination of tire pair having the same belt structure (or the same cord angle in belt) for front and rear wheels leads the worst result. The technical ideal of this type is out of the question in the conventional bias tires, but serves to solve the troubles peculiar to the radial tire, based on which optimum combination of tires for front and rear wheels of the motocycle is selected, whereby the running stability of pneumatic radial tires for motorcycle can be improved considerably.

Figure 3:
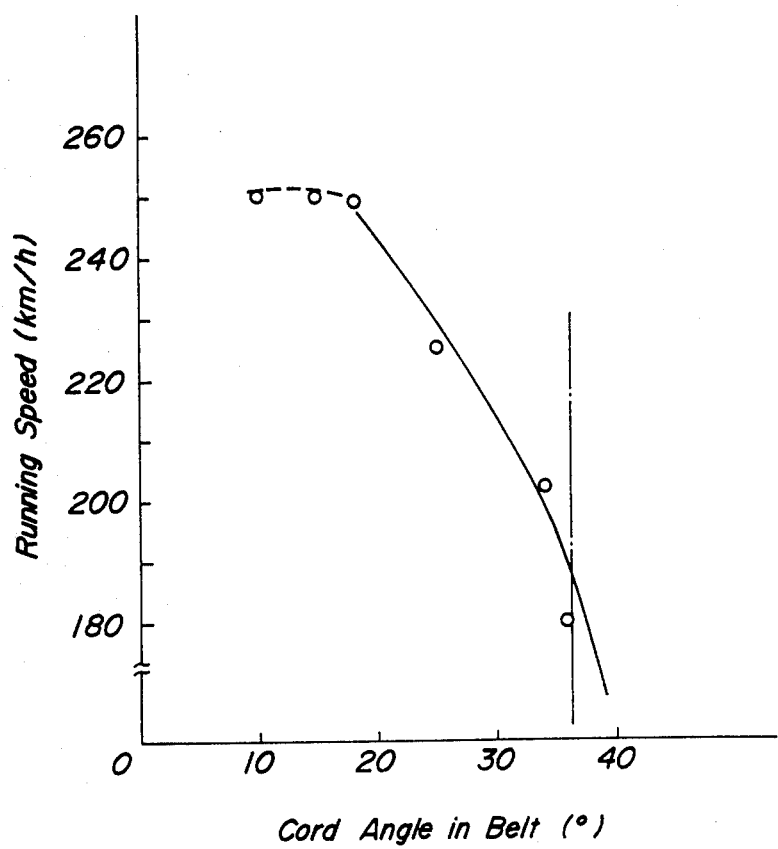
FIG. 3 is a graph showing an influence of cord angle in belt on high-speed durability.

The above tire pairs other than the control tires were tested with respect to speed-time durability by raising the running speed from 170 km/hr at a rate of 10 km/hr every 10 minute period to obtain a result as shown in FIG. 3. As apparent from FIG. 3, the durability is deteriorated with the increase of the cord angle in the belt, from which it is obvious that an acceptable maximum value of cord angle is 36°.

In the above test, the tire was run on a steel drum having a smooth surface with a diameter of 1.7 m under conditions of a load corresponding to 88% of normal load at 38° C.±3° C. and an internal pressure of 3.0 kg/cm².

As previously mentioned, according to the invention, an effective solution can be given to the occurrence of wobble phenomenon anticipated during the high-speed running of the motorcycle, which has quite been ignored in the prior art, whereby the steering stability of the motorcycle inclusive of straight running performance at high speed and cornering performance can be improved largely.

What is claimed is:

1. A motorcycle having a front tire and a rear tire defining a pair of pneumatic belted tires, each tire comprising; a tread, a pair of sidewalls toroidally extending from said tread, a pair of bead portions each located at each radially inward edge of said sidewalls and containing a bead core therein, a carcass wrapped around said bead core from inside toward outside to reinforce the tread and sidewalls and composed of at least one rubberized ply containing organic fiber cords inclined at an angle of 50°–90° with respect to the equatorial plane of each tire, said tread being extended between said sidewalls up to both portions corresponding to the maximum width of each tire at substantially an equal thickness or that thickness which slightly reduces from the tread center toward both sidewalls, and a belt disposed between said tread and said carcass at a width substantially corresponding to a tread width and composed of at least two rubberized plies each containing cords with a modulus of elasticity of at least 600 kg/mm² arranged at a certain inclination angle with respect to the equatorial plane of each tire, the rear tire having a section height and a section width larger than those of the front tire, said cords crossed with each other, and an inclination angle $\alpha$ of cord in said belt of the rear tire for a rear wheel of the motorcycle and an inclination angle $\beta$ of cord in the belt of the front tire for a front wheel of the motorcycle satisfy the following relationship:

$(\alpha - \beta) \geq 4°$ when $15° \leq \alpha \leq 26°$, or $(\alpha - \beta) \geq -0.3\alpha + 11.8°$ when $26° \leq \alpha \leq 36°$.

2. A motorcycle having a pair of pneumatic belted tires according to claim 1, wherein a turnup end of said carcass is overlapped with a side edge of said belt.

3. A motorcycle having a pair of pneumatic belted tires according to claim 1, wherein a stiffener inclusive of a tapered rubber filler extending above said bead core toward said tread and having a Shore A hardness of at least 60° is disposed between said carcass and the turnup portion thereof and a top end of said stiffener located at least 40% of a radial height H of said sidewall.

4. A motorcycle having a pair of pneumatic belted tires according to claim 3, wherein said stiffener is a composite structure of said rubber filler with at least one reinforcing layer located between the rubber filler and the turnup portion of the carcass and containing cords inclined at an angle of 15°–30° with respect to the circumferential direction of each tire.

5. A motorcycle having a pair of pneumatic belted tires according to claim 4, wherein at least one of top ends of the rubber filler and the reinforcing layer locates within a range of 50%–75% of the radial height of the sidewall.

6. A motorcycle having a pair of pneumatic belted tires according to claim 1, wherein said belt is composed of two rubberized plies each containing metal cords therein.

7. A motorcycle having a pair of pneumatic belted tires according to claim 1, wherein said belt is composed of two rubberized plies each containing fiber cords therein.

8. A motorcycle having a pair of pneumatic belted tires according to claim 1, wherein said belt is composed of one rubberized metal cord ply and one rubberized fiber cord ply, and said fiber cord ply is arranged on the side of said carcass.

9. A motorcycle having a pair of pneumatic belted tires according to claim 1, wherein said belt is composed of two rubberized plies formed by folding both end parts of a single rubberized fiber cord layer toward a direction of said equatorial plane of each tire.

10. A motorcycle having a pair of pneumatic belted tires according to claim 6 or 8, wherein said metal cord is formed by twisting 6 to 25 steel filaments with a diameter of not more than 15 mm.

11. A motorcycle having a pair of pneumatic belted tires according to claim 6 or 8, wherein said metal cord ply has a spacing ratio between cords of 35%–65%.

12. A motorcycle having a pair of pneumatic belted tires according to claim 1, wherein said inclination angle $\alpha$ of cord in the belt of the rear tire for a rear wheel is within a range of 20°–34°.

13. A motorcycle having a pair of pneumatic belted tires according to claim 1, wherein said thickness of the tread is reduced from the center thereof toward the sidewall at a thickness ratio of 1:approximately 0.8.

* * * * *